Patented Nov. 17, 1953

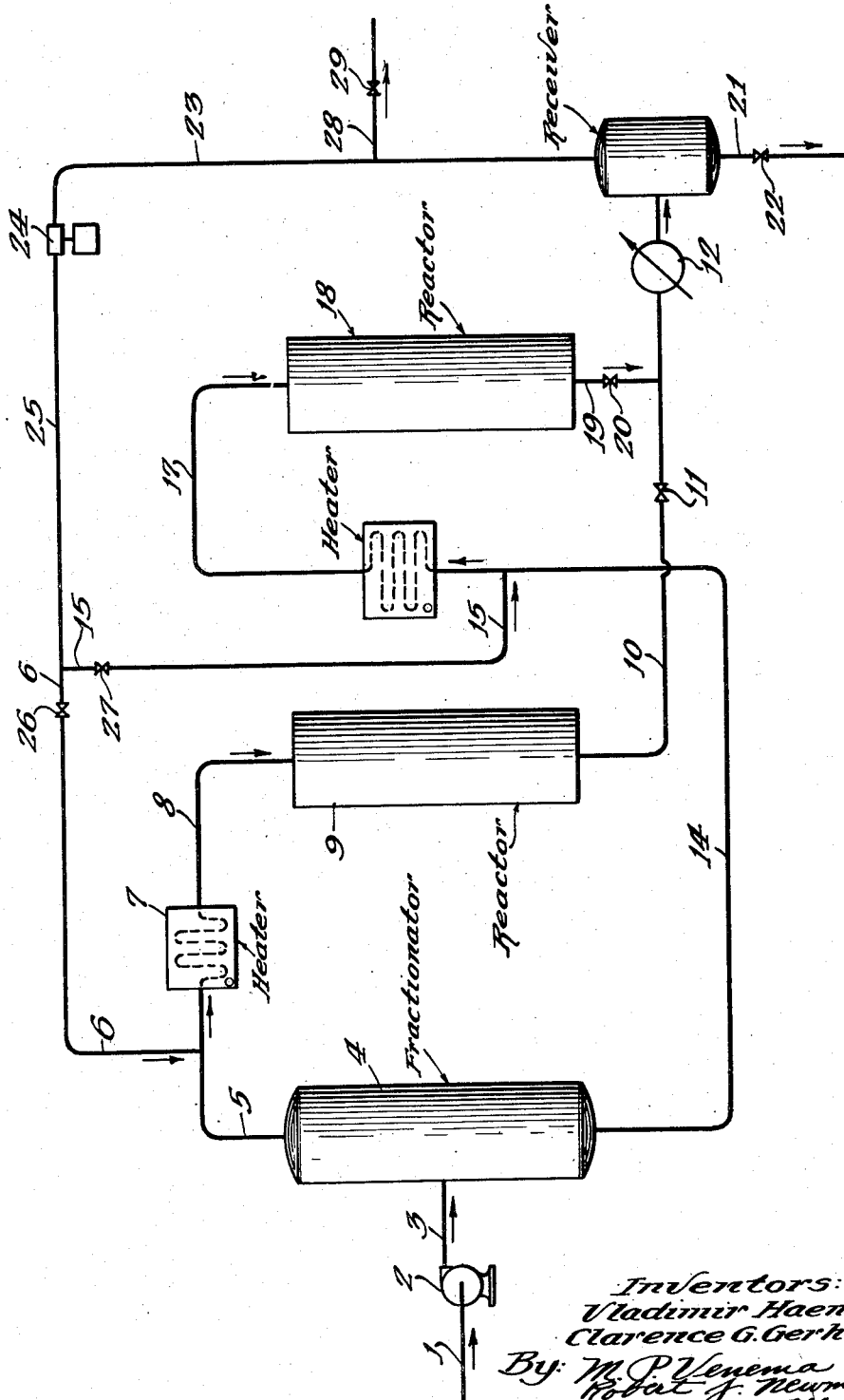

2,659,692

UNITED STATES PATENT OFFICE 2,659,692

CATALYTIC REFORMING OF HYDROCARBONS IN TWO STAGES UTILIZING A PLATINUM - ALUMINA - HALOGEN CATALYST COMPOSITE

Vladimir Haensel, Hinsdale, and Clarence G. Gerhold, Riverside, Ill., assignors to Universal Oil Products Company, Chicago, Ill., a corporation of Delaware Application February 26, 1949, Serial No. 78,586

4 Claims. (Cl. 196—49)

This invention relates to the catalytic conversion of hydrocarbon reactants containing naphthenes and/or paraffins and boiling approximately within the gasoline range. It is more specifically concerned with the reforming of straight-run gasolines and naphthas in the presence of hydrogen and a platinum-containing catalyst by a process which comprises separating the charging stock into at least two fractions and processing each fraction under particular conditions of operation especially suitable for that material.

Recently, a superior reforming catalyst has been developed, said catalyst comprising platinum and alumina as the principal constituents and frequently containing minor amounts of a halogen, particularly fluorine or chlorine. This catalyst is capable of increasing the octane number of hydrocarbon stocks such as straight-run gasolines and naphthas to values that are substantially higher than those that ordinarily can be reached by thermal reforming. In addition, the yield-octane number relationship is much better than are the corresponding relationships obtained in either thermal reforming or in most of the prior catalytic reforming processes. It has been found that by an appropriate selection of operating conditions and by charging a feed stock of low end point, this catalyst can be used for a number of weeks without regeneration. However, if the end point of the charge is greater than, for example, about 350° F., or if the charging stock contains minor traces of impurities, which have not as yet been definitely identified but which are known to cause catalyst deactivation by increasing the rate of carbonaceous deposition, the rate of catalyst deactivation is greatly accelerated and regeneration is required in a comparatively short time. In order that this process be economically attractive it is desirable that it be substantially non-regenerative. We have invented a process by means of which greatly increased catalyst life is obtained with poor stocks as well as with good stocks. In addition, a superior yield-octane number relationship often is obtained.

In one embodiment our invention relates to a process which comprises fractionating a hydrocarbon reforming charging stock into at least two fractions of different boiling ranges, separately subjecting each fraction to reforming in the presence of a catalyst comprising platinum and alumina, and regulating the operating conditions employed with each fraction so that the intensity of said conditions varies inversely with the average boiling points of the fractions.

In a more specific embodiment our invention relates to a reforming process which comprises fractionating a hydrocarbon reactant containing naphthenes and boiling approximately within the gasoline range into a higher and a lower boiling fraction, separately reforming each fraction in the presence of hydrogen and a catalyst comprising platinum and alumina, and in each reforming operation correlating the variables selected from the group consisting of hydrocarbon reactant partial pressure, hydrogen partial pressure, temperature, and catalyst activity, in such a manner that the lower boiling fraction is subjected to relatively more intense operating conditions than is the higher boiling fraction.

In another specific embodiment our invention relates to a process which comprises fractionating a straight-run gasoline into a higher and a lower boiling fraction, reforming the lower boiling fraction in one zone in the presence of a catalyst comprising platinum and alumina, and reforming the higher boiling fraction in another zone in the presence of a catalyst comprising platinum and alumina, the intensity of the operating conditions to which the lower boiling fraction is subjected being at least about twice as great as the intensity of the operating conditions to which the higher boiling fraction is subjected.

In the hydrocarbon reforming process employing a catalyst comprising platinum and alumina, the hydrocarbon reactant to be converted is preheated and, together with hydrogen, is contacted with the catalyst. As is usual in catalytic processes of this type, the hydrocarbon conversion reaction is accompanied by a fouling reaction which causes deposition of carbonaceous material, hereinafter called carbon, on the catalyst. The presence of the deposit lowers the activity of the catalyst and in the usual operation a point is soon reached at which the effectiveness of the catalyst is so low that it must either be discarded and replaced with fresh catalyst, or the activity of the catalyst must be restored by the removal of the carbon by combustion. Both methods are expensive, and it can readily be seen that substantial economic and operating advantages would accrue if it were possible to hinder or retard carbon formation. We have found that the rate of carbon formation can be greatly reduced if the charging stock is divided into two or more fractions of different boiling ranges and each of said fractions is processed under conditions that approach the optimum for that particular material.

In hydrocarbon reforming processes employing a catalyst comprising platinum and alumina, and usually containing a minor amount of fluorine or chlorine, the octane number increase that is obtained appears to be the result of a number of reactions including aromatization, hydro-cracking, and isomerization. When a full boiling range straight-run gasoline or a relatively wide boiling range naphtha is employed as the charging stock, the higher boiling portion of the feed is upgraded largely through aromatization, i. e., dehydrogenation of naphthenes to aromatics; whereas the lower boiling fractions are upgraded to a considerable extent by isomerization and by the hydrocracking reaction. In addition, it has been observed that the higher boiling fractions produce a considerably larger amount of carbon than do the lower boiling fractions of the feed at the same reforming conditions. This apparently is due to the fact that the rate of carbon formation is a function of the boiling range of the feed stock and to the fact that the relatively intense operating conditions that are necessary to satisfactorily upgrade the lower boiling portion of the feed are too drastic for the higher boiling portion. Thus, under the usual conditions of operation, the operating conditions and the catalyst life are limited by and primarily dependent upon the carbon-forming tendency of the higher boiling fractions. We have found that the higher boiling fractions may be satisfactorily reformed under relatively mild conditions of operation. Under these conditions the carbon-forming tendency is greatly reduced. On the other hand, we have found that fairly intense operating conditions are necessary in order to satisfactorily reform the lower boiling fractions. However, even under these relatively drastic conditions of operation, the amount of catalyst carbon formed from the lower boiling fractions is relatively small.

Under these circumstances, we have found that we obtain markedly increased overall catalyst life as well as a superior yield-octane number relationship by separating the hydrocarbon feed stock into, for example, a higher boiling fraction and a lower boiling fraction, subjecting the lower boiling fraction to reforming in the presence of a catalyst comprising platinum and alumina in one step and subjecting the higher boiling fraction to reforming in the presence of a catalyst comprising platinum and alumina in another step, the operating conditions being relatively more intense in the first mentioned step than in the second mentioned step. The low boiling fraction is thus processed under relatively intense conditions which favor hydrocracking and isomerization, although aromatization also will take place. The high boiling fraction is subjected to milder conditions that favor aromatization.

The hydrocarbon stocks that may be converted in accordance with our process comprise hydrocarbon fractions containing saturated hydrocarbons, particularly naphthenes. The preferred stocks are those consisting essentially of naphthenes and paraffins, although minor amounts of aromatics also may be present. This preferred class includes straight-run gasolines, natural gasolines, and the like. The gasoline may be a full boiling range gasoline having an initial boiling point within the range of from about 50° to about 100° F. and an end boiling point within the range of from about 325° to about 425° F., or it may be a selected fraction thereof which usually will be a higher boiling fraction commonly referred to as naphtha, and generally having an initial boiling point of from about 125° to about 250° F. and an end boiling point within the range of about 350° F. to about 425° F.

The catalysts comprising platinum and alumina that are preferred for use in our hydrocarbon reforming process may contain substantial amounts of platinum, but, for economic as well as for product yield and quality reasons, the platinum content usually will be within the range of from about 0.05% to about 5.0 weight per cent. A particularly effective catalyst of this type contains relatively minor amounts, usually less than about 3 weight per cent (158 gram equivalents/100,000 grams of alumina) on a dry alumina basis, of a halogen, especially chlorine or fluorine. One method of preparing the catalyst comprises adding a suitable alkaline reagent such as ammonium hydroxide or carbonate to a salt of aluminum, such as aluminum chloride, aluminum sulfate, aluminum nitrate, and the like, in an amount sufficient to form aluminum hydroxides, which upon drying, can be converted to alumina. The halogen may be added to the resultant slurry in the form of an acid such as hydrogen fluoride or hydrogen chloride, or as a volatile salt such as ammonium fluoride or ammonium chloride. The amount of combined halogen in the finished catalyst usually is maintained within the range of from about 0.1% to about 8% by weight of the alumina on a dry basis.

The use of the term "catalyst comprising platinum and alumina" in the specification and appended claims is intended to include platinum-alumina composites of the type described above including those containing minor amounts of a halogen. The exact manner in which the halogen or halide ion is present in the catalyst is not known although it is believed to be present in the form of a chemical combination or loose complex with the alumina and/or platinum components. Because the exact chemical constitution of such halogen-containing catalysts is not known, we sometimes refer to them as "catalysts comprising platinum, alumina, and a halogen." It is known, however, that the presence of a small amount of a halogen in the catalyst enhances the hydrocracking activity thereof; for platinum-alumina composites that are substantially halogen-free possess very little ability to promote hydrocracking. In addition, the presence of halogen promotes isomerization reactions.

We have found that the optimum operating conditions for reforming lower boiling fractions of a given charge stock are relatively more intense than are the optimum conditions for reforming higher boiling fractions of the same stock. Consequently, we operate our process in a manner such that the lower boiling fractions are subjected to more drastic operating conditions than are the higher boiling fractions. The principal variables that determine the intensity of the reforming operations are hydrocarbon reactant partial pressure, hydrogen partial pressure, temperature, and catalyst activity. It is not necessary that the intensity of each variable be greater in the operation with the light fraction, but merely that the resultant of all the variables be more intense. To illustrate this point, the temperature at which the light fraction is reformed may be 880° F. and the temperature at which the heavy fraction is reformed may be 900° F. However, if the other variables are sufficiently more intense in the operation with the light fraction so that the resultant overall intensity of reforming is greater with the light fraction than it is with the heavy fraction, the requirements of our process have been met.

The hydrocarbon reactant partial pressure ordinarily should lie within the range of from about 30 to about 400 p. s. i. a. The reason for the lower limit is found in the fact that in the presence of hydrogen the catalyst employed in our process promotes hydrocracking and isomerization of said stocks as well as aromatization. However, in order to obtain hydrocracking there must be a rather appreciable partial pressure of hydrogen in the reaction zone. If the hydrocarbon partial pressure is much below about 30 pounds, the hydrogen/hydrocarbon ratio must be excessive in order that the hydrogen partial pressure will be sufficiently high to effectively bring about hydrocracking. On the other hand, if the hydrocarbon partial pressure is greater than about 400 pounds, the total pressure becomes excessive even at fairly low hydrogen/hydrocarbon ratios of the order of 4:1. We have found that if the hydrocarbon reactant partial pressure is increased, all other conditions remaining the same, the intensity of the reforming operation increases and the formation of carbon on the catalyst increases.

The hydrogen partial pressure ordinarily used should be within the range of from about 200 to about 1200 p. s. i. a., preferably from about 300 to about 1000 p. s. i. a. At hydrogen partial pressures below the indicated lower limits there is little or no hydrocracking and there is excessive production of catalyst carbon. On the other hand, at hydrogen partial pressures in excess of about 1200 p. s. i. a., the proportion of hydrocracking increases, aromatization decreases, and hydrogen consumption is encountered. Within the approximate limits indicated, the intensity of the reforming operation decreases as the hydrogen partial pressure is increased.

The reforming temperatures employed in our process preferably should lie within the range of about 750° F. to about 1000° F. At temperatures much below about 750° F. the hydrocarbon conversion reactions are quite slow and very low space velocities must be employed to obtain appreciable conversions. In addition, an unfavorable naphthene-aromatic equilibrium is encountered. At reaction temperatures of the order of 1000° F. or higher, an appreciable amount of thermal reaction takes place accompanied by poorer liquid recovery and more rapid catalyst deactivation. In the correlation that is more fully explained hereinafter, effective average catalyst temperatures are used, said temperatures being obtained by dividing the reactor into convenient segments, each of which may be considered as being approximately at a constant temperature. The relative reaction rate coefficient for each segment at its average temperature is obtained and this coefficient is multiplied by the fractional part of the bed corresponding to the segment. The resultant products are added up for the entire bed, and the sum is the effective average rate coefficient for the bed. The temperature corresponding to this reaction rate coefficient is then the effective average temperature. However, since the correlation is designed to give only the intensity of the operating conditions with the light fraction relative to the intensity of the operating conditions with the heavy fraction, i. e., a relative intensity, we have found that the arithmetic average temperature may be employed with satisfactory results. The arithmetic average temperature is obtained by taking a fairly large number of temperature points through the bed and simply averaging them. This method avoids the rather involved method of obtaining the effective average temperature. The severity of reforming increases with increasing temperature.

The activity of the reforming catalyst is another variable that enters into the determination of the intensity of the reforming conditions. The platinum-alumina catalysts that are used in our process may contain substantial amounts of platinum, but, for economic as well as for product yield and quality reasons, the platinum content usually will be within the range of from about 0.05% to about 5.0%. A particularly effective catalyst of this type contains relatively minor amounts, usually less than about 3 weight per cent on a dry alumina basis, of a halogen, especially chlorine and fluorine. One method of preparing these catalysts comprises adding a suitable alkaline reagent such as ammonium hydroxide or carbonate to a salt of aluminum, such as aluminum chloride, aluminum sulfate, aluminum nitrate, and the like, in an amount sufficient to form aluminum hydroxides, which upon drying are converted to alumina. The halogen may be added to the resultant slurry in the form of an acid such as hydrogen fluoride or hydrogen chloride. A colloidal suspension of platinic sulfide is then prepared by introducing hydrogen sulfide into an aqueous solution of chloroplatinic acid until said solution reaches a constant color, which usually is a dark brown. The resultant colloidal suspension of platinic sulfide is commingled with the aluminum hydroxide slurry at room temperature followed by stirring to obtain intimate mixing. The resulting materials are then dried at a temperature of from about 200° to about 400° F. for a period of from about 4 to about 24 hours or more to form a cake. The dried material will then be converted into pills or other shaped particles. Thereafter the catalyst may be subjected to a high temperature (900–1400° F.) calcination or reduction treatment prior to use. The halogen content of the catalyst is one of the principal factors affecting the activity of the catalyst. The activity of the catalyst, especially for hydrocracking and isomerization, increases and the intensity of the reforming operation increases as the halogen content of the catalyst increases.

The preferred weight hourly space velocities used in our process, weight hourly space velocity being defined as the weight of hydrocarbon charge per hour per weight of catalyst in the reaction zone, usually will lie within the range of from about 0.2 to about 40. In contrast to hydrocarbon reactant partial pressure, hydrogen partial pressure, temperature, and catalyst activity, which are intensive factors, space velocity is an extensive factor in our process. In a given operation, the intensive variables ordinarily will be selected in accordance with the teachings herein set forth. The space velocity may then be adjusted to obtain the desired reforming severity. The severity of reforming increases as the space velocity is decreased.

As hereinbefore stated, a preferred embodiment of our invention relates to a process which comprises fractionating a straight-run gasoline into a higher and a lower boiling fraction, reforming the lower boiling fraction in one zone in the presence of a catalyst comprising platinum and alumina, and reforming the higher boiling fraction in another zone in the presence of a catalyst comprising platinum and alumina, the intensity of the operating conditions to which the lower boiling fraction is subjected being at least about twice as great as the severity of the operating conditions to which the higher boiling fraction is subjected. In this embodiment of the invention, the intensity of the operating conditions to which the lower boiling fraction is subjected increases as the gasoline hydrocarbon partial pressure, the temperature, and the halogen content of the catalyst increase relative to those employed with the higher boiling fraction, and as the hydrogen partial pressure in the zone with the lower boiling fraction decreases relative to that in the zone with the higher boiling fraction.

Additional features and advantages of our invention will be apparent from the following description of the attached drawing which illustrates a particular method for conducting a hydrocarbon reforming operation in accordance with the present invention.

Referring to Figure 1, a 100–400° F. straight-run gasoline is passed through line 1, picked up by pump 2, and passed through line 3 into fractionator 4. A distillate with a boiling range of about 100–200° F. is removed overhead from fractionator 4 through line 5. Provision ordinarily will be made for condensing at least a portion of this material and using the condensate for reflux by means not shown in the drawing. The light fraction flowing through line 5 is joined by a stream of recycle hydrogen passing through line 6 and the mixture of hydrogen and hydrocarbon are passed through heater 7 wherein they are heated to a temperature of 915° F. The heated effluent from heater 7 is passed through line 8 into reactor 9.

Reactor 9 contains a catalyst comprising 0.3 weight per cent platinum and 0.3 weight per cent fluorine on alumina. The operating conditions are a total pressure of 700 p. s. i. a., a hydrogen/hydrocarbon ratio of 5:1, a catalyst inlet temperature of 915° F., and a weight hourly space velocity of 2.

The effluent from reactor 9 is withdrawn through line 10 containing valve 11 and is passed through condenser 12 into receiver 13.

The heavy fraction having a boiling range of approximately 200–400° F. is withdrawn as a bottoms product from fractionator 4 and is passed through line 14 and is joined by a stream of recycle hydrogen flowing through line 15. The commingled streams are passed through heater 16 wherein they are heated to a temperature of 895° F. The effluent from heater 16 is passed through line 17 into reactor 18.

Reactor 18 contains a bed of catalyst comprising 0.3% platinum and 0.1% fluorine on alumina. The pressure is 700 pounds, the hydrogen/hydrocarbon ratio is 5:1, the catalyst inlet temperature is 895° F., and the weight hourly space velocity is 2.

The effluent from reactor 18 is withdrawn through line 19 containing valve 20 and is passed through condenser 12 into receiver 13. The liquid hydrocarbons in receiver 13 are withdrawn through line 21 containing valve 22 and are passed to suitable fractionation and storage equipment. The uncondensed gas, predominantly hydrogen, in receiver 13 is withdrawn through line 23, is picked up by compressor 24 and is passed through line 25. A portion of this recycle hydrogen stream passes through line 6 containing valve 26 and the other portion passes through line 15 containing valve 27. Excess hydrogen is withdrawn from the system through line 28 containing valve 29 or make-up hydrogen may be added through this line.

The intensity of the reforming conditions to which the light fraction is subjected in the foregoing example is considerably greater than the intensity of the reforming conditions to which the heavy fraction is subjected. In this example, the reforming conditions to which the light fraction is subjected is 19.1 times greater than the intensity to which the heavy fraction is subjected.

From the foregoing, it can be seen that we have described our invention in terms that will be understood by those skilled in the art. By means of our invention, we are able to achieve longer catalyst life and better yield-octane number relationships in the reforming of hydrocarbon stocks in the presence of catalysts comprising platinum and alumina. Said catalyst ordinarily will contain a minor amount of a halogen, particularly fluorine or chlorine. The exact form in which the halogen is present in the catalyst composite is not known, although it is believed that it enters into some chemical combination or loose complex with the alumina and/or platinum. In any event, the presence of the halogen alters the activity of the catalyst in the manner hereinbefore set forth.

We claim as our invention:

1. A reforming process which comprises distilling a hydrocarbon fraction containing naphthenes and boiling below about 425° F. into a higher and a lower boiling fraction, reforming said lower boiling fraction in the presence of hydrogen and a catalyst comprising platinum and alumina in a first zone and reforming said higher boiling fraction at less intense conditions in the presence of hydrogen and a catalyst comprising platinum and alumina in a second zone, the catalyst in said first zone containing a greater effective concentration of halogen promoter than the catalyst in said second zone.

2. The process of claim 1 further characterized in that said halogen promoter comprises fluorine.

3. The process of claim 1 further characterized in that said halogen promoter comprises chlorine.

4. A process which comprises fractionating a hydrocarbon reforming charging stock into a light fraction and a heavier fraction, reforming the heavier fraction in the presence of a catalyst comprising platinum, alumina and a halogen, and separately subjecting said light fraction to more drastic reforming in the presence of a platinum-alumina catalyst containing a higher concentration of halogen than the first-mentioned catalyst.

VLADIMIR HAENSEL.
CLARENCE G. GERHOLD.

References Cited in the file of this patent

UNITED STATES PATENTS

| Number | Name | Date |
| --- | --- | --- |
| 2,324,165 | Layng et al. | July 13, 1943 |
| 2,348,599 | Brown | May 9, 1944 |
| 2,479,110 | Haensel | Aug. 6, 1949 |